(12) United States Patent
Chiu et al.

(10) Patent No.: US 6,285,007 B1
(45) Date of Patent: *Sep. 4, 2001

(54) ION SENSOR GLOW PLUG ASSEMBLY

(75) Inventors: Randolph Kwok-Kin Chiu, Davison; Haskell Simpkins, Grand Blanc; Keith Michael Brenske, Flushing, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,167

(22) Filed: Aug. 18, 1999

(51) Int. Cl.[7] .................................................. F23Q 7/00
(52) U.S. Cl. ...................................... 219/270; 123/145 A
(58) Field of Search .................................. 219/270, 544, 219/260; 123/145 A, 145 R; 361/264–266

(56) References Cited

U.S. PATENT DOCUMENTS

| 4,739,731 | 4/1988 | Habich et al. | |
|---|---|---|---|
| 4,786,781 | * 11/1988 | Nozaki et al. | 219/270 |
| 5,626,781 | * 5/1997 | Schmidt et al. | 219/270 |
| 5,645,742 | * 7/1997 | Schmidt et al. | 219/270 |
| 5,893,993 | * 4/1999 | Kurano | 219/270 |
| 5,922,229 | * 7/1999 | Kurano | 219/270 |

FOREIGN PATENT DOCUMENTS

| 3706555 | * 1/1988 | (DE) . | |
|---|---|---|---|
| 19737396 | 3/1998 | (DE) . | |
| 19738915 | 3/1998 | (DE) . | |
| 4-9517 | * 1/1992 | (JP) | 219/270 |
| 10-110950 | * 4/1998 | (JP) . | |
| 10-110951 | * 4/1998 | (JP) . | |
| 10-110952 | * 4/1998 | (JP) . | |
| 10-122114 | * 5/1998 | (JP) . | |
| 97/38223 | 10/1997 | (WO) . | |

* cited by examiner

*Primary Examiner*—John A. Jeffery
(74) *Attorney, Agent, or Firm*—Vincent A. Cichosz

(57) ABSTRACT

An ion sensor glow plug assembly includes a shell for attachment to a cylinder head of a compression ignition engine and having a passageway extending axially therethrough. The ion sensor glow plug assembly also includes a center terminal disposed at least partially in the passageway of the shell and connected to a source of power to create a heating circuit. The ion sensor glow plug assembly includes a glow sheath disposed at least partially is the passageway of the shell and about the center terminal to create an ion sensing circuit. The ion sensor glow plug assembly further includes an insulator disposed at least partially in the passageway of the shell and about a portion of the glow sheath and extending axially therefrom to clean off soot on the glow sheath. The ion sensor glow plug assembly includes a coating disposed about a portion of the glow sheath between the glow sheath and the shell to isolate the shell from the glow sheath.

20 Claims, 2 Drawing Sheets

ION SENSOR GLOW PLUG ASSEMBLY

TECHNICAL FIELD

The present invention relates generally to glow plugs for engines and, more particularly, to an ion sensor glow plug assembly for an engine of a vehicle.

BACKGROUND OF THE INVENTION

It is known to provide an ion sensor for an engine of a vehicle. The ion sensor is used as a closed loop feedback to detect fuel injection timing and intensity of combustion in each cylinder of the engine so as to control and improve engine performance.

It is also known to provide a glow plug for a compression ignition engine such as a diesel engine. The glow plug typically has a ceramic tip that extends into a chamber of the engine. The purpose of the glow plug is to aid in cold starting of the diesel engine.

Although the above ion sensors and glow plugs have worked, it is desirable to combine the two to provide an ion sensor glow plug assembly. It is also desirable to provide an ion sensor glow plug assembly that is self-cleaning for soot in a compression ignition engine such as a diesel engine of a vehicle.

SUMMARY OF THE INVENTION

It is, therefore, one object of the present invention to provide an ion sensor glow plug assembly for an engine of a vehicle.

It is another object of the present invention to provide an ion sensor glow plug assembly that is self-cleaning for soot in a compression ignition engine of a vehicle.

To achieve the foregoing objects, the present invention is an ion sensor glow plug assembly including a metal shell for attachment to a cylinder head of a compression ignition engine and having a passageway extending axially therethrough. The ion sensor glow plug assembly also includes a center terminal disposed at least partially in the passageway of the shell and connected to a source of power to create a heating circuit. The ion sensor glow plug assembly includes a glow sheath disposed at least partially is the passageway of the shell and about the center terminal to create an ion sensing circuit. The ion sensor glow plug assembly further includes an insulator disposed at least partially in the passageway of the shell and about a portion of the glow sheath and extending axially therefrom to clean off soot on the glow sheath. The ion sensor glow plug assembly includes a coating disposed about a portion of the glow sheath between the glow sheath and the shell to isolate the shell from the glow sheath.

One advantage of the present invention is that an ion sensor glow plug assembly is provided for an engine of a vehicle. Another advantage of the present invention is that the ion sensor glow plug assembly is self-cleaning for soot in a compression ignition engine such as a diesel engine. Yet another advantage of the present invention is that the ion sensor glow plug assembly incorporates a carbon self-cleaning ion sensor into a glow plug. Still another advantage of the present invention is that the ion sensor glow plug assembly incorporates a metal glow sheath. A further advantage of the present invention is that the ion sensor glow plug assembly allows closed loop control of a compression ignition engine such as a diesel engine.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
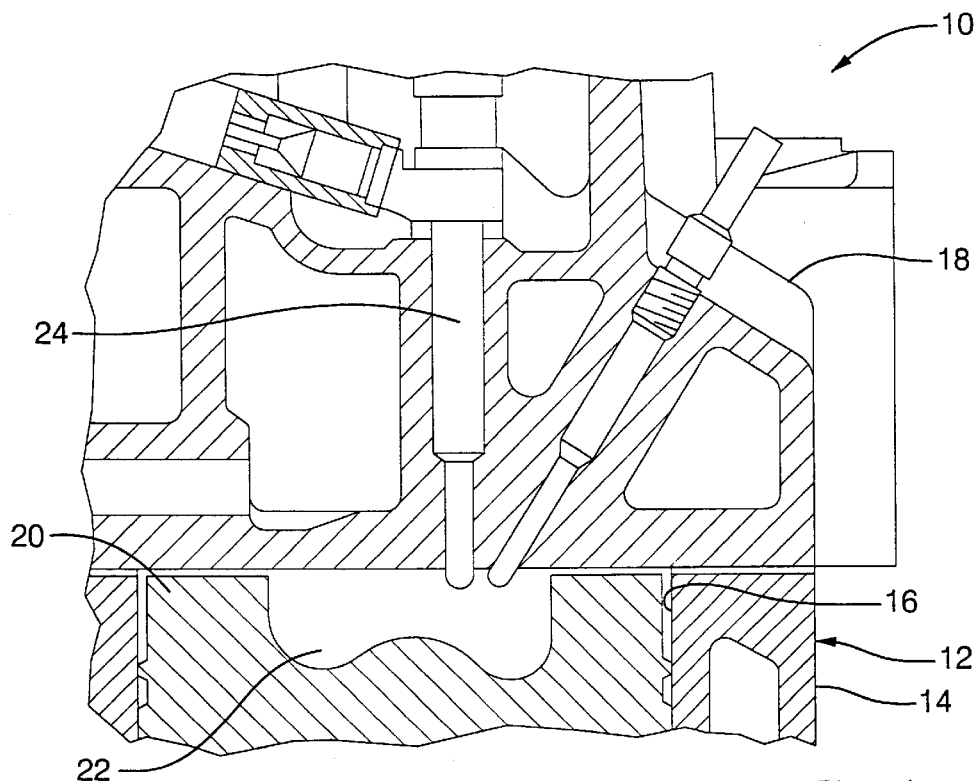
FIG. 1 is a fragmentary elevational view of an ion sensor glow plug assembly, according to the present invention, illustrated in operational relationship with an engine of a vehicle.
Figure 2:
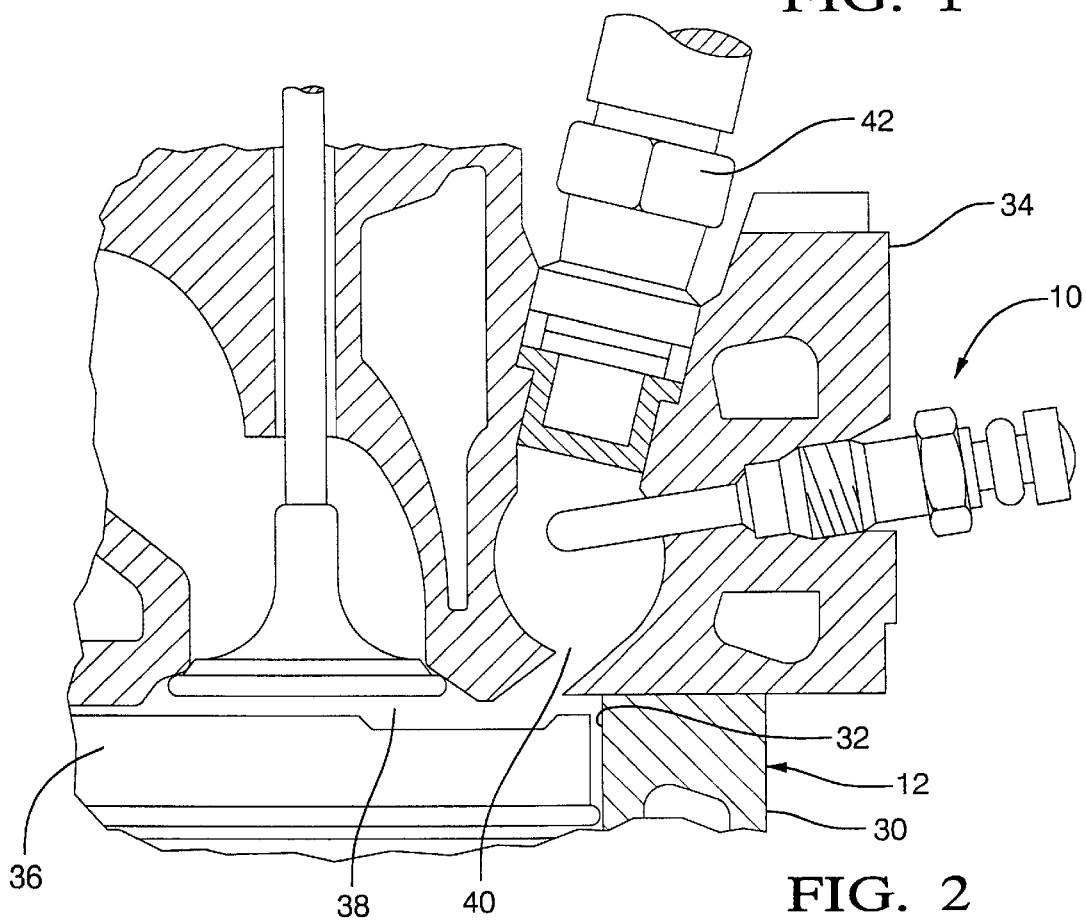
FIG. 2 is a view similar to FIG. 1 of the ion sensor glow plug assembly illustrated in operational relationship with another engine.

Referring to the drawings and in particular FIGS. 1 and 2, one embodiment of an ion sensor glow plug assembly 10, according to the present invention, is shown for a compression ignition engine, generally indicated at 12, such as a diesel engine in a vehicle (not shown). As illustrated in FIG. 1, the compression ignition engine 12 may be an open chamber type diesel engine including a cylinder block 14 defining a cylinder 16 closed by a cylinder head 18. The compression ignition engine 12 also includes a piston 20 reciprocal in the cylinder 16 and defines a recessed bowl, which together with the cylinder head 18 forms a combustion chamber 22. The compression ignition engine 12 includes an injection nozzle or injector 24 mounted in the cylinder head 18 which sprays fuel into the combustion chamber 22 for compression ignition therein. The compression ignition engine 12 further includes the ion sensor glow plug assembly 10 mounted in the cylinder head 18 and extending into the combustion chamber 22 for a function to be described. It should be appreciated that, except for the ion sensor glow plug assembly 10, the compression ignition engine 12 is conventional and known in the art.

As illustrated in FIG. 2, the compression ignition engine 12 may be pre-chamber type diesel engine including a cylinder block 30 defining a cylinder 32 closed by a cylinder head 34. The compression ignition engine 12 also includes a piston 36 reciprocal in the cylinder 32. The piston 36 and cylinder head 34 form a combustion chamber 38, which connects with a pre-combustion chamber or pre-chamber 40 within the cylinder head 34. The compression ignition engine 12 includes an injection nozzle or injector 42 mounted in the cylinder head 34 for injecting fuel into the pre-chamber 40. The compression ignition engine 12 includes the ion sensor glow plug assembly 10 mounted in the cylinder head 34 and extending into the pre-chamber 40 for a function to be described. It should be appreciated that, except for the ion sensor glow plug assembly 10, the compression ignition engine 12 is conventional and known in the art.

Figure 3:
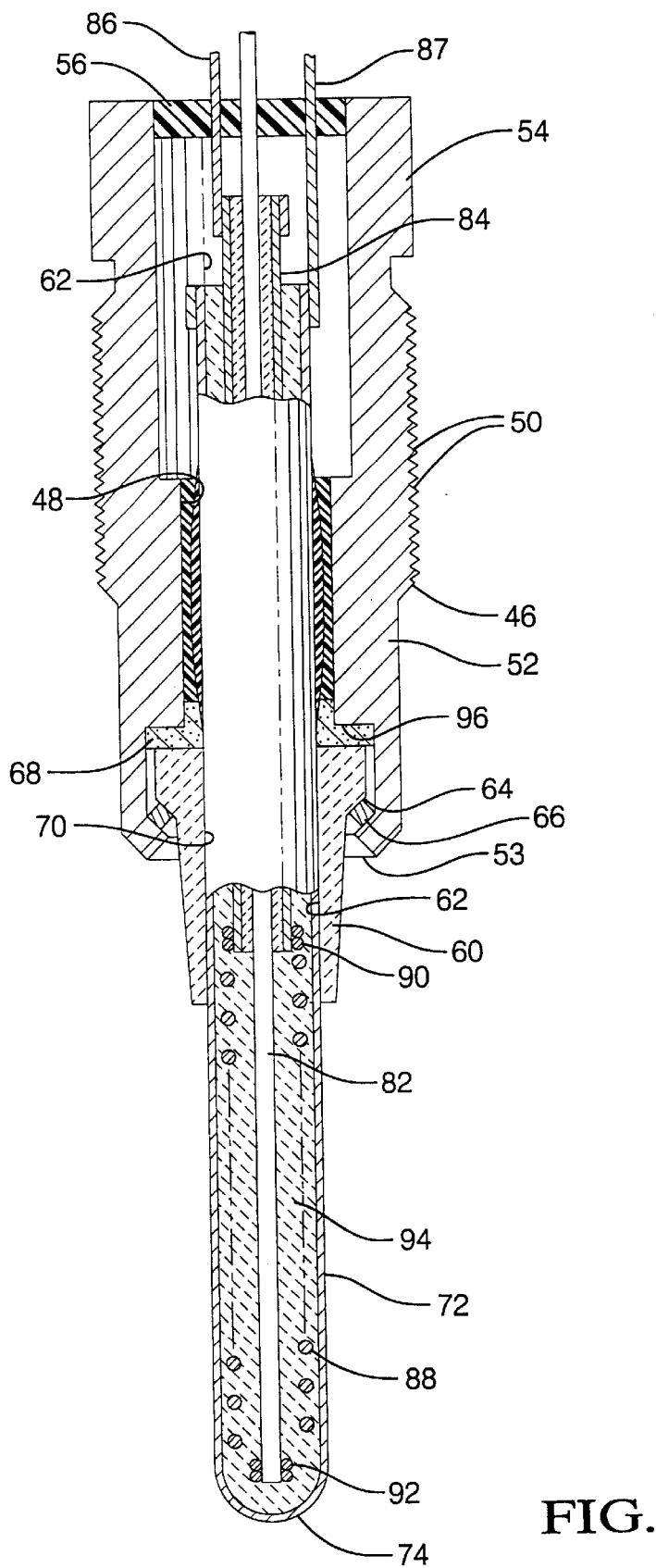
FIG. 3 is a fragmentary elevational view of the ion sensor glow plug assembly of FIGS. 1 and 2.

Referring to FIG. 3, the ion sensor glow plug assembly 10 includes a housing or shell 46 extending axially for engaging the cylinder head 18,34. The shell 46 is generally cylindrical in shape and has a passageway 48 extending axially therethrough. The shell 46 has a plurality of exterior threads 50 for threaded engagement with the cylinder head 18,34. The exterior threads 50 are of a ten millimeter (10 mm) type. The shell 46 has a reduced diameter end 52 adjacent one end of the exterior threads 50 forming a shell seat 53 and a hexagonal shaped end 54 adjacent the other end of the exterior threads 50 for a function to be described. The hexagonal shaped end 54 is of a ten millimeter (10 mm) type. The shell 46 is made of a metal material such as steel.

The ion sensor glow plug assembly 10 may include a seal 56 disposed in the passageway 48 at the hexagonal shaped end 54 of the shell 46 and an electrical connector (not shown) disposed adjacent the seal 56 for a function to be described. The seal 56 is made of either a plastic or elastomeric material. It should be appreciated that the electrical connector is conventional and known in the art.

The ion sensor glow plug assembly 10 also includes an insulator 60 partially disposed in the shell 46 and extending into the passageway 48. The insulator 60 is generally cylindrical in shape and extends axially. The insulator 60 has a passageway 48 extending axially therethrough. The insulator 60 has an insulator seat 64 extending radially outwardly and axially. The insulator 60 is made of a ceramic material such as alumina. The insulator 60 is extended into a glow area of a glow sheath 72 to be described to glow the glow sheath 72 and clean off any soot (carbon) that may induce a short circuit between the shell 46 and glow sheath 72. It should be appreciated that the shell seat 53 is crimped to retain the insulator 60 to the shell 46.

The ion sensor glow plug assembly 10 includes a gasket or seal 66 disposed between the insulator 60 and the shell 46 to provide vibration damping and mechanical support. The gasket 66 is made of a relatively soft metal material such as copper or steel. The gasket 66 is disposed in the passageway 48 between the shell seat 53 and the insulator seat 64.

The ion sensor glow plug assembly 10 includes a matting 68 having an aperture 70 extending axially therethrough disposed in the passageway 48 adjacent the insulator 60. The matting 70 is generally annular and made of an insulating material such as intumescent fiber. It should be appreciated that the matting 70 prevents soot and/or humidity from shorting a surface of a seal 72 to be described.

The ion sensor glow plug assembly 10 includes a glow sheath 72 partially disposed in the passageway 48 of the shell 46. The glow sheath 72 is generally cylindrical and tubular in shape. The glow sheath 72 has a closed end 74 spaced axially from the end of the insulator 60. The glow sheath 72 extends axially from the closed end 74 through the apertures 62 and 70 of the insulator 60 and matting 70, respectively, to an open end 76. The glow sheath 72 is made of a metal material such as Inconel 601. The glow sheath 72 is secured by suitable means such as a press-fit into the shell 46.

The ion sensor glow plug assembly 10 also includes an first coating 78 on a portion of the glow sheath 72 that is partially disposed in the shell 46 and extending into the passageway 48. The first coating 78 is disposed annularly about the glow sheath 72 and extends radially and axially. The first coating 78 has one end spaced from the open end 76 of the glow sheath 72 and extends axially to the matting 70. The first coating 78 has a radial thickness of 0.002 inches to 0.010 inches, preferably 0.004 inches to 0.006 inches. The first coating 78 is made of an insulating material such as alumina (Al2O3) or other ceramic material. It should be appreciated that the first coating 78 isolates the glow sheath 72 from the shell 46, thus creating an ion sensing circuit, and retains a resistance sufficient for ion sensing during glowing and/or engine operation.

The ion sensor glow plug assembly 10 includes a second or conformal coating 80 disposed over the first coating 78. The second coating 80 is a relatively thin layer to mechanically retain the glow sheath 72 in the shell 46. The second coating 80 is made of a high temperature material such as polyamides, silicones, locktite, epoxy or the like having high resistivity at high temperature such as four hundred degrees centigrade (400° C.). It should be appreciated that the second coating 80 can be cured before or after final assembly. It should also be appreciated that the second coating 80 prevents moisture formation between the glow sheath 72 and shell 46 and seals off combustion gases from passing between the first coating 78 and the shell 46.

The ion sensor glow plug assembly 10 includes a center or centerwire terminal 82 disposed within the glow sheath 72. The center terminal 82 is generally a metal wire having a diameter of approximately 0.030 inches and extends axially. The center terminal 82 has one end spaced axially from the closed end 74 of the glow sheath 72 and extends axially to another end disposed in the passageway 48. The center terminal 82 is made of a metal material such as nickel (Ni) or nickel-chromium (Ni—Cr). The ion sensor glow plug assembly 10 includes an inner or coaxial tube 84 disposed about a portion of the center terminal 82. The inner tube 84 has one end spaced a predetermined distance such as fifty (50) to eighty (80) millimeters (mm) from the closed end 74 of the glow sheath 72. The inner tube 84 extends axially to a second end spaced a predetermined distance from the other end of the center terminal 82. The inner tube 84 is made of a metal material such as nickel (Ni) or the like. It should be appreciated that the inner tube 84 is spaced radially from the center terminal 82. It should also be appreciated that the predetermined distance is a high temperature glow area of the glow sheath 72. It should further be appreciated that the end of the inner tube 84 is spaced from the end of the insulator 60 to provide an overlap of insulator 60 into the glow zone for soot cleaning.

The ion sensor glow plug assembly 10 includes a first or heater terminal 86 extending through the seal 56 and attached to the inner tube 84 by suitable means such as welding. The first terminal 86 matingly engages the electrical connector. The first terminal 86 is made of a metal material such as nickel (Ni). The ion sensor glow plug assembly 10 also includes a second or ion sensor terminal 87 extending through the seal 56 and attached to the glow sheath 72 by suitable means such as welding. The ion sensor terminal 87 matingly engages the electrical connector. The ion sensor terminal 87 is made of a metal material such as nickel (Ni). It should further be appreciated that the inner tube 84 and first terminal 86 are a second heater terminal for the heater portion 92 of the electrical coil 88 to be described.

The ion sensor glow plug assembly 10 includes an electrical coil 88 disposed about a portion of the center terminal 82, which is also the other heater terminal. The electrical coil 88 has a first or current regulating portion 90 having one end disposed about the inner tube 84 and extending axially. The current regulating portion 90 is made of a metal material such as nickel-iron (Ni—Fe) or cobalt-iron (Co—Fe). The electrical coil 88 has a second or heating portion 92 disposed about the end of the center terminal 82. The heating portion 92 has one end connected to the current regulating portion 90 by suitable means such as spot welding and another end connected to the end of the center terminal 82 by suitable means such as spot welding. The heating portion 92 is made of a metal material such as nickel-chromium (Ni—Cr) or iron-chromium-aluminum (Fe—Cr—Al). It should be appreciated that the inner tube 84, first terminal 86 and center terminal 82 act as terminals for the electrical coil 88 to create a heating circuit and are connected to the electrical connector, which, in turn, is connected to an electronic controller (not shown). It should be appreciated that the controller is conventional and known in the art.

The ion sensor glow plug assembly 10 further includes a filling material 94 disposed in the glow sheath 72 and inner tube 84. The filling material 94 is made of a ceramic material such as magnesia or alumina. The filling material 94 is a plurality of ceramic tubes disposed in the open end of the glow sheath 72 and inner tube 84 which are crushed to fill the glow sheath 72 and inner tube 84. The filling material 94 is disposed between the electrical coil 88 and center terminal 82 and between the inner tube 84 and center terminal 82 and between the inner tube 84 and glow sheath 72. The filling material 94 provides mechanical support of the center terminal 82, electrical coil 88 and inner tube 84 in an x-y direction. The filling material 94 also acts as a heat conductor from the electrical coil 88 to the glow sheath 72.

To assemble the ion sensor glow plug assembly 10, the heating portion 92 of the electrical coil 88 is joined such as by welding to the current regulating portion 90 of the electrical coil 88. The heating portion 92 is then joined such as by welding to the center terminal 82, which is the first heater terminal. The current regulating portion 90 of the electrical coil 88 is joined such as by welding to the inner tube 84, which is the second heater terminal. Crushable ceramic tubes, made of magnesia or alumina, are then inserted to the inside and outside of the terminals/electrical coil 88, which is, in turn, inserted into the glow sheath 72. The glow sheath 72 is then swaged to a smaller size to crush and compact the crushable tubes to form the filling material 94 for electrical insulation and for thermal conductivity between the center terminal 82, electrical coil 88 and glow sheath 72. The outer diameter of the glow sheath 72 is then impregnated with the first coating 78 using conventional Plasma Jet, High Velocity Oxy-Fuel (HVOF) or D-Gun® molten particle deposition processes. The first terminal 86 is attached to the inner tube 84 by suitable means such as welding. The ion sensor terminal 87 is attached to the glow sheath 72 by suitable means such as welding. Next, a thin second coating 80 is applied over the first coating 78. The glow sheath 72 is then mechanically retained such as by being press-fitted into the shell 46 through its lower end. The matting 70, having a decomposition temperature of greater than six hundred degrees centigrade (600° C.), is then inserted into the passageway 48 adjacent a shoulder 96 of the shell 46. The insulator 60 and gasket 66 are then inserted into the passageway 48 and the shell 46 is crimped over the gasket 66 to form the shell seat 53 and retain the matting 70 and insulator 60. The shell seat 53 is then machined to form an engine seat. The seal 56 is then inserted into the upper or open end of the passageway 48 of the shell 46. The ion sensor glow plug assembly 10 may be heated before or after final assembly to cure the first coating 78. The ion sensor glow plug assembly 10 is then completely assembled.

In operation of the ion sensor glow plug assembly 10, current flows from the electrical connector to the center terminal 82, which passes through the heating portion 92 and current regulating portion 90 of the electrical coil 88, inner tube 84 and first terminal 86 back to the electrical connector to form a glow plug circuit. The second terminal 87 and glow sheath 72 carry the supply voltage from the electrical connector for the ion sensor circuit. When there is combustion in the cylinder 16,32, the burnt gases are ionized and conduct or carry current from the electrical connector through the ion sensor terminal 87 to the glow sheath 72 and through the ionized gas to an engine ground, which is the piston 22,36 or the shell 46. The exposed portion of the insulator 60 is disposed in the high temperature area of the glow sheath 72 which will burn off by glowing any soot and moisture formation on the insulator 60 that may create reduced resistance or a short between the glow sheath 72 and the shell 46 to provide the soot self-cleaning feature of the ion sensor glow plug assembly 10. It should be appreciated that the second coating 80 aids to seal off combustion leakage between the first coating 78 and the shell 46. It should also be appreciated that the matting 70 prevents soot such as carbon from seeping through the clearance between the insulator 60 and the glow sheath 72, resulting in bridging or electrical shorting between the shell 46 and glow sheath 72.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An ion sensor glow plug assembly comprising:
   a shell for attachment to a cylinder head of a compression ignition engine and having a passageway extending axially therethrough;
   a center terminal disposed at least partially in said passageway of said shell and connected to a source of power to create a heating circuit;
   a glow sheath disposed at least partially in said passageway of said shell and about said center terminal to create an ion sensing circuit;
   an insulator disposed at least partially in said passageway of said shell and about a portion of said glow sheath and extending axially therefrom to clean off soot on said glow sheath; and
   a coating disposed about a portion of said glow sheath between said glow sheath and said shell to isolate said shell from said glow sheath.

2. An ion sensor glow plug assembly as set forth in claim 1 wherein said coating comprises an insulative material having a predetermined thickness disposed on an outer periphery of said glow sheath.

3. An ion sensor glow plug assembly as set forth in claim 1 wherein said glow sheath has a closed end spaced from an end of said center terminal.

4. An ion sensor glow plug assembly as set forth in claim 1 including an electrical coil disposed about a portion of said center terminal.

5. An ion sensor glow plug assembly as set forth in claim 4 wherein said electrical coil has a heating portion connected to said center terminal and a current regulating portion connected to said heating portion.

6. An ion sensor glow plug assembly as set forth in claim 4 including an inner tube disposed about a portion of said glow tip and connected to said electrical coil.

7. An ion sensor glow plug assembly as set forth in claim 6 including a terminal attached to said inner tube and a source of power.

8. An ion sensor glow plug assembly as set forth in claim 1 including a terminal connected to said glow sheath and a source of power.

9. An ion sensor glow plug assembly as set forth in claim 1 including a matting disposed within said passageway of said shell adjacent said insulator to prevent soot or moisture from shorting said glow sheath.

10. An ion sensor glow plug assembly as set forth in claim 1 including a second coating disposed over said coating to retain said glow sheath in said passageway of said shell.

11. An ion sensor glow plug assembly as set forth in claim 1 including a filling material disposed between said glow sheath and said center terminal.

12. A self-cleaning ion sensor glow plug assembly for a compression ignition engine comprising:
   a metal shell for attachment to a cylinder head of a compression ignition engine and having a passageway extending axially therethrough;
   a center terminal disposed at least partially in said passageway of said metal shell and connected to a source of power to create a heating circuit;
   a metal glow sheath disposed at least partially in said passageway of said metal shell and about said center terminal to create an ion sensing circuit;
   an insulator disposed at least partially in said passageway of said metal shell and about a portion of said metal glow sheath and extending axially therefrom to clean off soot on said metal glow sheath; and
   a first coating disposed about a portion of said metal glow sheath between said metal glow sheath and said metal shell to isolate said metal shell from said metal glow sheath.

13. A self-cleaning ion sensor glow plug assembly as set forth in claim 12 wherein said metal glow sheath has a closed end spaced from an end of said center terminal.

14. A self-cleaning ion sensor glow plug assembly as set forth in claim 12 including an electrical coil disposed about a portion of said center terminal.

15. A self-cleaning ion sensor glow plug assembly as set forth in claim 14 wherein said electrical coil has a heating portion connected to said center terminal and a current regulating portion connected to said heating portion.

16. A self-cleaning ion sensor glow plug assembly as set forth in claim 15 including an inner tube disposed about a portion of said center terminal and connected to said electrical coil.

17. A self-cleaning ion sensor glow plug assembly as set forth in claim 12 including a matting disposed within said passageway of metal shell adjacent said insulator to prevent soot or moisture from shorting said metal glow sheath.

18. A self-cleaning ion sensor glow plug assembly as set forth in claim 12 including a second coating disposed over said first coating to retain said metal glow sheath to said metal shell.

19. A self-cleaning ion sensor glow plug assembly as set forth in claim 12 including a filling material disposed between said insulator and said center terminal.

20. A self-cleaning ion sensor glow plug assembly for a diesel engine comprising:
   a metal shell for attachment to a cylinder head of a compressive ignition engine and having a passageway extending axially therethrough;
   a metal center terminal disposed at least partially in said passageway of said and connected to a source of power to create a heating circuit;
   a metal glow sheath disposed at least partially in said passageway of said metal shell and about said metal center terminal;
   an insulator disposed about said metal glow sheath and at least partially in said passageway of said metal shell and extending axially therefrom to clean off soot on said metal glow sheath;
   a first coating disposed about a portion of said metal glow sheath and at least partially in said passageway of said metal shell and extending axially therefrom to clean off soot on said glow sheath;
   a second coating disposed over said first coating to retain said metal glow sheath to said metal shell;
   a first terminal attached to said metal glow sheath and a source of power to create an ion sensing circuit;
   an electrical coil disposed about a portion of said metal center terminal having a heating portion connected to said metal center terminal and a current regulating portion connected to said heating portion;
   an inner tube disposed about a portion of said metal center terminal and connected to said current regulating portion; and
   a second terminal attached to said inner tube and to a source of power to create a heating circuit.

* * * * *